(No Model.)
F. T. F. DE LA CROIX, Dec'd.
J. A. GOLDSBOROUGH, Administrator.
RENDERING APPARATUS.
No. 550,342.    Patented Nov. 26, 1895.
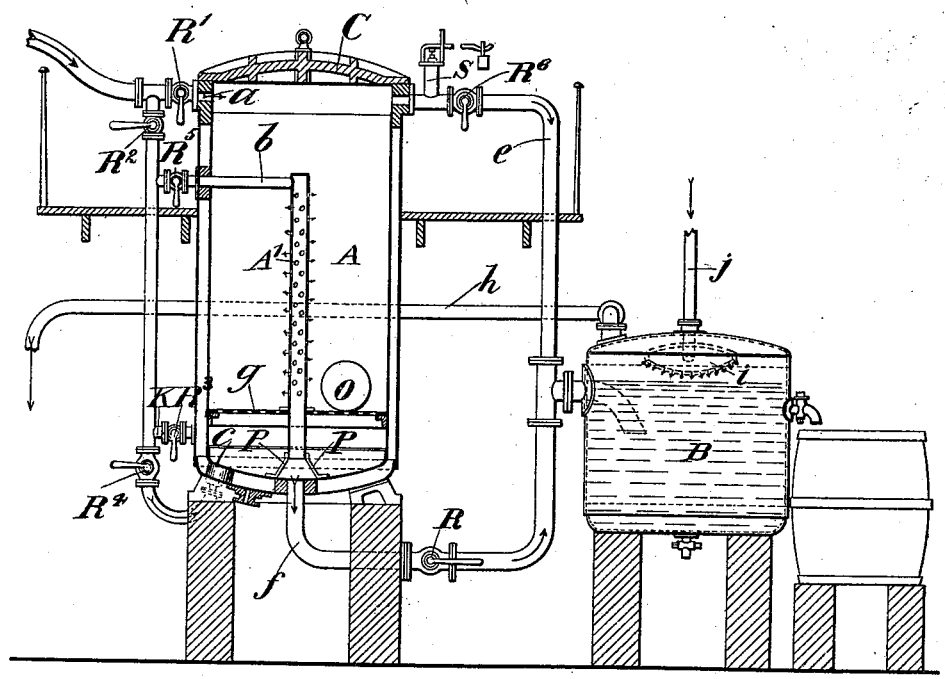

UNITED STATES PATENT OFFICE.

JOHN ALDEN GOLDSBOROUGH, OF WASHINGTON, DISTRICT OF COLUMBIA, ADMINISTRATOR OF FLORENT T. F. DE LA CROIX, DECEASED.

RENDERING APPARATUS.

SPECIFICATION forming part of Letters Patent No. 550,342, dated November 26, 1895.

Application filed October 9, 1893. Serial No. 487,602. (No model.) Patented in Belgium March 15, 1889, No. 85,186; in France June 13, 1890, No. 198,974; in England June 13, 1890, No. 9,176, and in Germany December 21, 1890, No. 57,439.

*To all whom it may concern:*

Be it known that FLORENT T. F. DE LA CROIX, deceased, late a subject of the King of Belgium, and formerly residing at Antwerp, Belgium, did during his life-time invent certain Apparatus for Desiccating and Sterilizing Waste Animal Substances and for Extracting Fat Therefrom, of which the following is a specification, and for which Letters Patent have been granted in Belgium, No. 85,186, dated March 15, 1889; in France, No. 198,974, dated June 13, 1890; in England, No. 9,176, dated June 13, 1890, and in Germany, No. 57,439, dated December 21, 1890.

This invention relates to apparatus which is designed to utilize meat unsuitable for consumption, bodies of animals, including those infected with contagious diseases, bad fish, and in general any waste of animal origin, by transformation after the extraction of the fat into pulverulent and dry manure rich in phosphates and nitrogen and completely sterilized, so that the bacteria have been destroyed.

To subject meat rejected in slaughterhouses and the like to the action of steam for the purpose of utilizing the same is not a new idea. The object of the present invention, however, is to utilize the fat of such rejected substances and transform the tissues of the same into a sterilized manure by means of superheated steam without giving rise to any emanations and without necessitating the concentration of a liquor containing almost the whole of the extractive substances—that is to say, to effect a kind of cremation by means of dry steam, whereby a great economy and other advantages are realized.

The accompanying drawing represents an elevation, partly in section, of an apparatus embodying the invention.

This apparatus comprises a cylinder A, provided with a double wall or casing, into which is introduced through an upper opening, which is ordinarily closed by a cover C, the animal refuse, including the bones and in general all the substances of an animal nature, which it is desired to thoroughly sterilize for the destruction of the bacteria and to transform into dry manure. This cylinder A is in communication at its upper and lower ends with pipes or passages $a$ and $c$ for admitting superheated steam from a generator. At the center of the above-mentioned cylinder A, supported by feet P, is provided a column A', perforated with a great number of holes all over its periphery and closed at its upper end. The said column near its upper end is in communication with a pipe $b$, which enables steam to be admitted into the same. The cylinder A is provided with a false bottom $g$, which consists of a perforated metal plate, upon which is spread a cloth or wire-gauze having small meshes. At the upper end of the said cylinder A in a discharge-pipe $e$ is arranged a safety-valve $s$. The said pipe $e$ enables the steam to be let out when desired.

In the bottom of the cylinder A terminates a pipe $f$, which serves for conducting the fat from this cylinder into a reservoir B. The aforesaid cylinder A is, moreover, provided near its lower end with an opening O, which is closed by means of a cover and which serves for removing the refuse after the sterilization and desiccation. The steam can be admitted between the two walls of this cylinder by means of the pipe K, as will be seen from the drawing. All the pipes are provided with cocks, which enable the steam to be directed to a definite point of the said cylinder A and the admission of the steam to be cut off in case of necessity.

The reservoir B for receiving the fat is provided at its upper end with a pipe $h$, one part of which extends below the furnace of the generator, and through which pipe the steam and air contained in the apparatus are discharged. Another pipe $j$, terminating in a rose-head $i$, enables the introduction of cold water into the aforesaid reservoir B. The said reservoir is, moreover, provided with a cock, through which the fat which floats upon the water is drawn off. A wash-out cock and a manhole are also provided for the purpose of cleaning out the said reservoir.

The operation is effected in the following manner: The cylinder A having been charged with the animal substances to be sterilized and dried, it is closed by means of its cover C. Steam is then admitted between the two walls of the cylinder by opening cocks R² and R³, provided for the purpose. In this manner the substances are heated prior to the admission of steam to the interior of the cylinder, thereby obviating the formation of a liqour resulting from the condensation of the steam. The steam-admission cocks R', R⁴, and R⁵ are then opened and the steam at once passes from above and below and from the center into the interior of the mass and divides the latter, while at the same time it destroys by its heat the bacteria and melts the fatty substances, which latter descend to the bottom $g$ and filter through the cloth and the perforated metal plate $g$. When the steam has acted for a sufficient length of time, the outlet-cock R is opened and cold water is at the same time admitted through the aforesaid pipe $j$ into the reservoir B. At this moment the last traces of melted fat are expelled from the mass pressed through the cloth and the perforated plate $g$, the whole of which constitutes a kind of filter-press, and are passed through a pipe $f$ into the reservoir B. The operation being terminated, the cocks R' and R⁵ are closed and a cock R⁶ opened. The steam contained in the magma leaves through a pipe $e$, and the substances are dried under the action of the heat due to the steam between the two walls of the cylinder A. This magma is subsequently removed through the door $o$ of the said cylinder and the product obtained is passed, if necessary, to an ordinary drying-stove, wherein the desiccation is rapidly effected, then to a crushing apparatus, and put in sacks in which it may be sold, as manure. The fat is put in tuns or other receptacles in order to be utilized for any of the well-known purposes for which it is applicable.

What I claim as the invention of the said FLORENT T. F. DE LA CROIX is—

1. In an apparatus of the character described, the combination of a closed receptacle, pipe connections at opposite ends of the same for admitting super-heated steam into the said receptacle, a perforated steam-pipe longitudinally arranged within the receptacle, a pipe connection for admitting super-heated steam into the perforated pipe, a perforated false bottom, a liquid draw-off pipe communicating with the receptacle below the false bottom, and a steam discharge pipe leading from the upper part of the receptacle; substantially as described.

2. In an apparatus of the character described, the combination of a closed receptacle, a pipe connection for the admission of super-heated steam into said receptacle, a false bottom in said receptacle, a draw-off pipe below the false bottom, a fat-receiving vessel with which said draw-off pipe communicates, a steam discharge pipe leading from the upper part of the closed receptacle to the fat receiving vessel, a cold-water pipe leading into the upper part of the fat-receiving vessel and having a rose or other spray device on its end, a steam-and-air escape pipe leading from the top of said fat-receiving vessel, and means for discharging the contents of said vessel; substantially as described.

In testimony whereof I have signed my name to this specification in the presence of two subscribing witnesses.

JOHN ALDEN GOLDSBOROUGH,
*Administrator of Florent T. F. De La Croix, deceased.*

Witnesses:
JOHN CLENNIE,
ALEX. S. STEUART.